April 11, 1939.  H. G. HOLMES  2,153,867
BENDING TOOL
Filed April 25, 1938
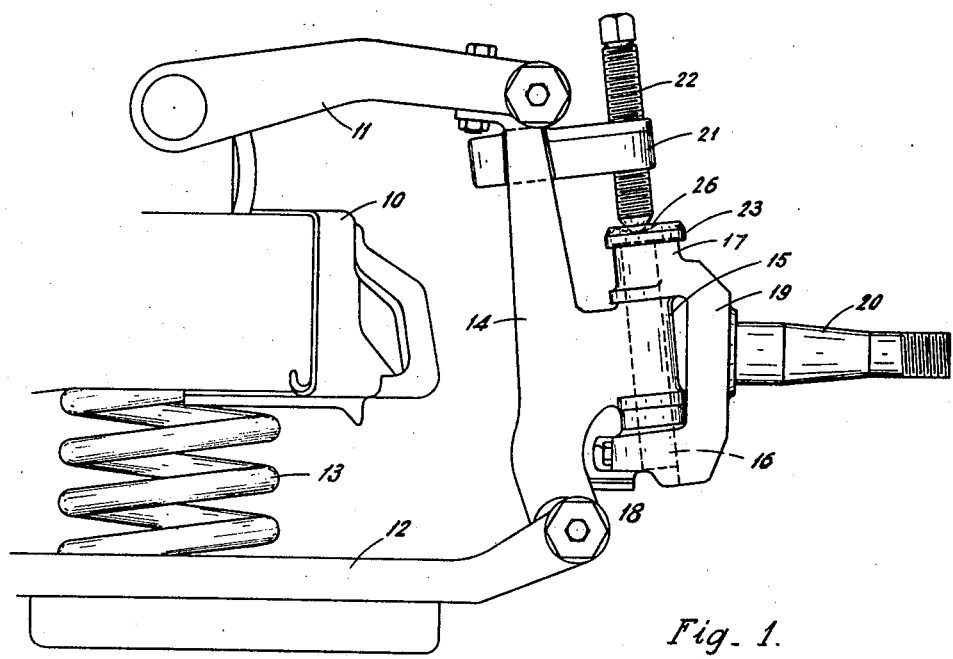
Fig. 1.
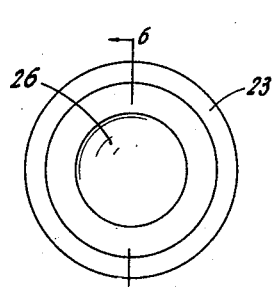
Fig. 5.
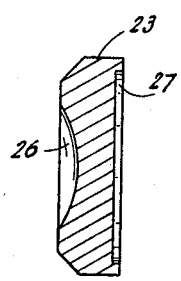
Fig. 6.
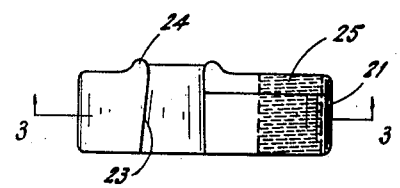
Fig. 2.
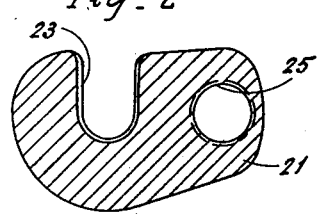
Fig. 3.
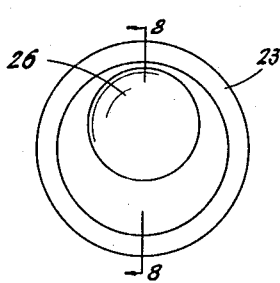
Fig. 7.
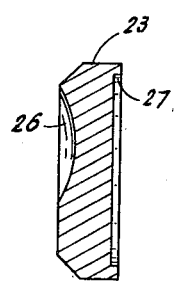
Fig. 8.
Fig. 4.
INVENTOR.
Herbert G. Holmes.
BY Philip A. Minnis
ATTORNEY.

Patented Apr. 11, 1939

2,153,867

UNITED STATES PATENT OFFICE 2,153,867

BENDING TOOL

Herbert Glenn Holmes, Lansing, Mich., assignor to Food Machinery Corporation, San Jose, Calif., a corporation of Delaware Application April 25, 1938, Serial No. 204,091

6 Claims. (Cl. 153—32)

This invention relates to a tool for changing the alignment characteristics of dirigible automobile wheels and is concerned more particularly with the provision of a tool for increasing camber on the pantograph type of independent front wheel suspension mechanism which have no provision for camber adjustment. In this type of automobile front wheel suspension, the factory provides only a small amount of camber and as looseness develops in the parts because of wear, the camber gradually decreases and eventually may become negative, and result in excessive tire wear and wander.

It is a general object of my invention to provide a tool which enables simple and easy correction of the above noted defective camber condition.

Another object of my invention is to provide a tool which can be applied to the king pin boss and the steering knuckle support arm of independently suspended front automobile wheels to bend the arm and thereby increase the camber of the associated wheel.

The above and other objects of my invention will become apparent from the following description of a preferred embodiment thereof as disclosed in the accompanying drawing, in which:

Fig. 1 is a fragmentary front elevational view of the left hand front wheel suspension means of an automobile having a pantographic type suspension device with the tool of my invention operatively related thereto.

Fig. 2 is an enlarged elevational view of the support arm bending clamp shown in Fig. 1.

Fig. 3 is a horizontal section of the bending clamp taken in the plane of the line 3—3 in Fig. 2.

Fig. 4 is a front elevational view of a similar bending clamp for use with the right hand front wheel assembly of the automobile.

Fig. 5 is a plan view of the abutment collar which is placed on the king pin boss to receive and position the adjusting screw.

Fig. 6 is a sectional view of the collar of Fig. 5 taken in the plane of the line 6—6 therein.

Fig. 7 is a plan view of a modified form of abutment collar of the type shown in Fig. 1 in which the screw receiving recess is placed eccentrically with respect to the circumference of the collar.

Fig. 8 is a sectional view of the abutment collar of Fig. 7 taken in the plane of the line 8—8 of Fig. 7.

As stated above, the tool disclosed herein is particularly useful with front wheel suspension means of the pantographic type, and a typical form of such a suspension means is shown in Fig. 1 where the frame of the automobile is indicated at 10, together with respective upper and lower control arms 11 and 12 which are pivotally connected at their outer ends to the steering knuckle support arm 14 which is provided with a king pin boss 15 to receive the king pin 16 in the usual manner. The ends of the king pin 16 are disposed in the respective upper and lower bosses 17 and 18 of the steering knuckle 19 to which the spindle 20 is attached for connection to the wheel in the usual manner. The above described construction is conventional, and it is believed that a more detailed description is unnecessary.

The tool for changing the camber of the wheel by bending the steering knuckle support arm comprises generally a removable clamp 21 which is formed at one end to engage the support arm and is provided with a threaded aperture at its other end to receive an adjusting or bending screw 22 which has its lower end seated in and positioned by a recessed abutment collar 23 which is mounted on the upper steering knuckle boss 17.

Referring to Figs. 1, 2 and 3, the clamp 21 is provided adjacent one end with a vertically extending tapered recess 23 defined at its upper end by a raised ledge 24. The recess 23 is designed to fit over and conform generally to the contour of the upper end of the steering knuckle support arm 14. Adjacent its other end, the clamp 21 is provided with threaded aperture 25 to receive the adjusting screw 22 whose rounded end is adapted for operative engagement in a depression or seat 26 in the upper surface of the hardened abutment collar 23. The lower face of the collar 23 (Figs. 1, 6 and 8) is also recessed to provide an annular shoulder 27 to fit over the boss 17 and positively locate the collar on the boss. The collar 23, shown in Figs. 5 and 6, has its recess 26 centrally located, while that shown in Figs. 7 and 8 has its recess 26 eccentrically located with respect to the opposite recess formed within the annular shoulder 27. Different automobile models have different relative spacings of the steering knuckle support arm relative to the king pin boss, and the eccentric location of the recess 26 as shown in Figs. 1, 7 and 8 enables accurate positioning of the benidng tool relative to the arm and the boss by rotative adjustment of the collar on the boss.

In using the tool, the automobile is placed in operative relation to a wheel aligner of any suitable construction and the camber is checked. If the camber needs increasing, the clamp is attached to the upper end of the steering knuckle support arm as shown in Fig. 1, with the screw 22 engaging in the seat 26 of the abutment collar 23 which is seated on the upper steering knuckle boss. The set screw is then tightened against the steering knuckle with a suitable wrench so that the steering support arm is bent relative to the king pin boss thereon. During the bending operation, a check is kept on the camber reading of the wheel, so that the proper amount of bending of the support is obtained to provide the desired amount of camber.

While I have shown and described a preferred form of invention, it is to be understood that the invention is capable of variation and modification within the scope of the claims appended hereto.

I claim:

1. A bending tool for use in changing the alignment characteristics of dirigible automobile wheels, comprising a clamp having means to engage one portion of the wheel suspension means with the clamp extending substantially transversely thereof, an abutment for engaging another portion of the wheel suspension means, and an adjusting screw having threaded engagement with said clamp and extending at a right angle thereto for endwise engagement with said abutment, whereby adjusting movement of said screw operates to effect relative bending between said portions.

2. A bending tool for use in changing the angular relation of a steering knuckle support arm relative to its king pin boss, comprising a clamp for detachable connection to the support arm with the clamp extending substantially transversely thereof, and an adjusting screw threaded in said clamp and extending at a right angle thereto for transmitting endwise thrust to the king pin boss axially thereof.

3. A bending tool for use in changing the angular relation of a steering knuckle support arm relative to its king pin boss, comprising a clamp for detachable connection to the support arm with the clamp extending substantially transversely thereof, and an adjustable member movably connected to said clamp and extending substantially at a right angle thereto to transmit thrust axially of the king pin boss.

4. A bending tool for use in changing the angular relation of a steering knuckle support arm relative to its king pin boss, comprising a clamp having an arm engaging recess adjacent one end thereof and a threaded aperture adjacent the other end thereof, said recess and said aperture having their axes substantially parallel, a collar recessed at one end to fit over an adjacent king pin knuckle boss and having a seat at its other end, and an adjusting screw having threaded engagement with said clamp aperture and having an end for engagement with said collar seat.

5. A bending tool for use in changing the angular relation of a steering knuckle support arm relative to its king pin boss, comprising a clamp having an arm engaging recess adjacent one end thereof and a threaded aperture adjacent the other end thereof, said recess and said aperture having their axes substantially parallel, a collar recessed at one end to fit over an adjacent king pin knuckle boss for free rotative adjustment thereon and having an eccentrically located seat at its other end, and an adjusting screw having threaded engagement with said clamp aperture and having an end for engagement with said collar seat.

6. A bending tool for use in changing the angular relation of a steering knuckle support arm relative to its king pin boss, comprising a clamp having an arm engaging recess formed in a side of the clamp adjacent one end thereof, said recess having a U-shaped cross-sectional contour tapering from one face of the clamp for engagement with a steering knuckle support arm to support the clamp in transverse relation with respect to the arm, a threaded aperture adjacent the other end of said clamp having its axis parallel to the axis of said recess, and an adjusting screw having threaded engagement with said aperture and presenting an end to transmit thrust axially of the king pin.

HERBERT GLENN HOLMES.